C. O. SHELDON.
POULTRY APPLIANCE.
APPLICATION FILED JUNE 18, 1913.
1,095,471.
Patented May 5, 1914.
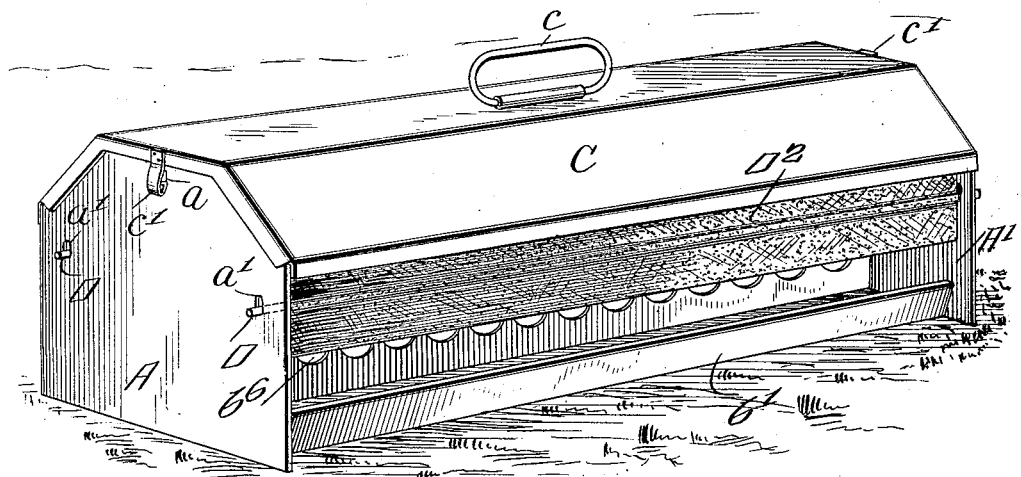
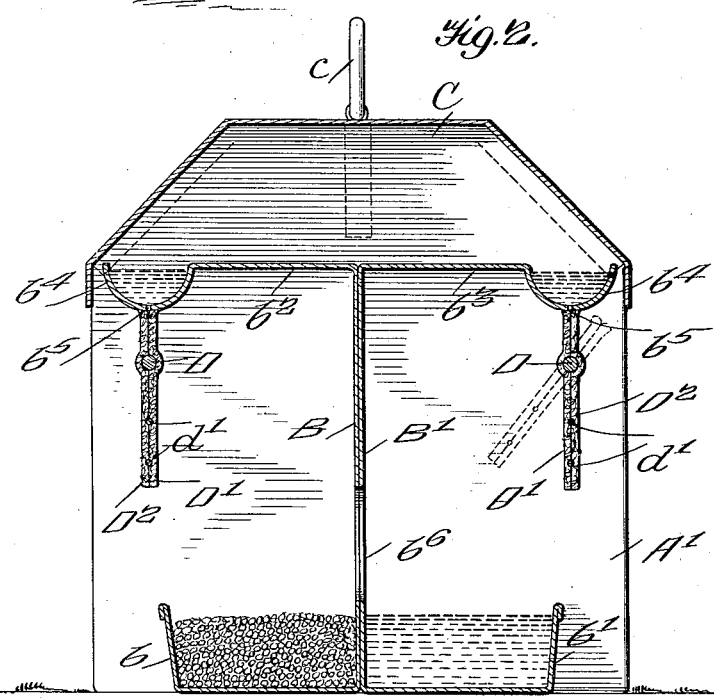
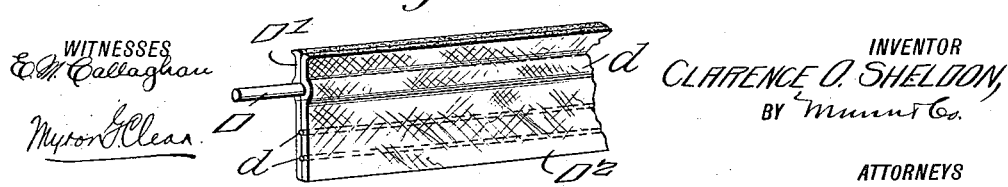
WITNESSES
INVENTOR
CLARENCE O. SHELDON,
BY
ATTORNEYS

UNITED STATES PATENT OFFICE.

CLARENCE O. SHELDON, OF CALALLEN, TEXAS, ASSIGNOR OF ONE-HALF TO WALTER H. WATERHOUSE, OF TEXAS.

POULTRY APPLIANCE.

1,095,471.  Specification of Letters Patent.  Patented May 5, 1914.

Application filed June 18, 1913.  Serial No. 774,362.

*To all whom it may concern:*

Be it known that I, CLARENCE O. SHELDON, a citizen of the United States, and a resident of Calallen, in the county of Nueces and State of Texas, have made a new and useful Improvement in Poultry Appliances, of which the following is a specification.

My present invention relates to poultry appliances, and more particularly to means for applying oil and other vermin destroying fluids to poultry, my object being to provide an apparatus in the form of a poultry feeder or watering trough having novel and simple means whereby to effectively apply oil and other fluids to the poultry as they eat or drink. This and other objects, to be hereinafter made apparent, I accomplish by means of the structure to be now described with reference to the accompanying drawing in which, Figure 1 is a perspective view of a poultry watering and feeding apparatus constructed with my improvements, Fig. 2 is a transverse vertical sectional view taken therethrough, and, Fig. 3 is a perspective view of one end of the fluid applying member removed.

Referring now to these figures, I have shown a particular form of feeding and watering apparatus which embodies end walls A and A' between central points of which are extended vertical longitudinal plates B and B', these plates being in contact with one another as particularly shown in Fig. 2, and having their ends secured to the end walls A and A' in any suitable manner.

The lower portions of the plates B and B' are bent laterally and outwardly in relatively opposite directions and have their extreme edges bent upwardly in order to provide troughs $b$ and $b'$, the bases of which are substantially co-extensive with the bases of the end walls A and A', and the upper portions of walls B and B' are also bent laterally to form top plates $b^2$ and $b^3$.

A removable hood or cover C of suitable proportions is disposed to cover the upper edges of the end walls A and to cover the top plates $b^2$ and $b^3$, this hood or cover having an intermediate handle $c$ and having depending spring catches $c'$ at its opposite ends which are arranged to engage projections $a$ of the end walls, thus removably securing the hood or cover in position.

Each of the top plates $b^2$ and $b^3$ is bent at its outer edge to form an upwardly opening trough $b^4$ which is substantially alined above the outer longitudinal edge of the trough below, and the base of which is provided with a longitudinal series of minute openings $b^5$. Each of these troughs is adapted to receive a supply of oil as particularly indicated in Fig. 2, and in order to effectively secure application of a small portion of this oil, or other vermin destroying fluid, I preferably mount below each of the troughs $b^4$ an applying member, the particular construction of which will be now referred to.

Each of the end walls A and A' is provided adjacent its opposite side edges with apertures $a'$ and through these apertures are extended the ends of longitudinal rods D. Each of these rods is extended between fabric strips D' and D², these strips being secured by lines of stitching upon opposite sides of the rod as indicated at $d$, and in such manner that when the rod is extended therethrough there will be sufficient frictional engagement between the fabric strips and the rod so that when the fabric strips are swung in one direction or the other the rod will be oscillated, the end portions of the latter being loose in the apertures $a'$ and readily movable to that end. The lower longitudinal edge of each of the strips D' and D² is selvage while the upper longitudinal edges thereof are raw and thus form a brush, the upper portions of these strips above the rod D being of just sufficient length as to normally rest against the lower surface of the trough $b^4$ in line with its apertures $b^5$, and to brush lightly over the base of the trough when the strips forming each fluid applying member are swung back and forth. That portion of each of the applying members extending below its rod D is of sufficient length as to depend to a point where it will necessarily contact with the heads of the birds as they are extended inwardly to obtain either food or water from the lower troughs $b$ and $b'$, and these depending portions of the applying members may be strengthened and their shape preserved by means of longitudinal brace rods $d'$ secured therein.

I preferably provide the intermediate vertical plates B and B' with series of alined apertures $b^6$ at a point slightly above the lower trough b and b' in order that light may filter through the walls and thus prevent excessive darkness within the apparatus. By virtue of the above fact and of the further fact that the applying members offer little, if any, resistance to the poultry, the resemblance to a trap is destroyed and the birds will freely approach and eat or drink from the lower troughs b and b' without fear.

By virtue of the particular manner in which the rods D are supported, these rods may be readily removed where it is desired to use the fluid applying members from time to time only. For instance, one or two days in each week or a longer period.

The apparatus which I have shown is simple and convenient, may be readily filled and prepared and will particularly and effectively supply oil and other vermin destroying fluid to the birds, without danger of exceeding the proper amount.

I claim:

1. An apparatus of the character described, comprising end walls, vertical plates arranged in contact with one another and extending between and connected to points intermediate the side edges of the said end walls, the lower portions of said plates being bent laterally in opposite directions and having upturned side edges in order to provide feeding and watering troughs, and the upper portions of said vertical plates being also bent laterally to provide top plates, a hood or cover having detachable engagement with the end walls, each of said top plates being bent adjacent its outer edge to provide troughs above the outer edges of the feeding and watering troughs, said last mentioned troughs being provided with series of minute apertures in their bases, and the end walls being provided with apertures adjacent their side edges, supporting rods having their ends loosely disposed and movable in the apertures of the end walls and extended beneath the apertures in the upper troughs, and flexible fabric strips through which the said rods are loosely extended, these strips having depending portions provided with lower selvage edges and upwardly extending portions, the edges of which are raw and adapted to engage the lower surface of the upper troughs, all for the purpose described.

2. In an apparatus of the character described, the combination of a frame comprising end walls, lower watering and feeding troughs extending longitudinally between the end walls, upper fluid containing troughs extending between the end walls and provided with lower discharge openings, rods having their ends loosely and removably mounted through apertures in the end walls and extending beneath the upper troughs, and fabric applying members through which the rods are removably extended, the said fabric members being flexible and having portions extending above and below the rods, for the purpose described.

3. In an apparatus of the character described, the combination of a frame comprising end walls, lower watering and feeding troughs extending longitudinally between the end walls, upper fluid containing troughs extending between the end walls and provided with lower discharge openings, rods having their ends loosely and removably mounted through apertures in the end walls and extending beneath the upper troughs, and fabric applying members through which the rods are removably extended, the said fabric members being flexible and having portions extending above and below the rods, the depending edges of said fabric members being selvage and the upwardly extending portions thereof being provided with raw edges adapted to contact with the lower portions of the upper troughs.

4. A device for applying a vermin destroying fluid to poultry, comprising the combination with a fluid containing trough having discharge openings, a supporting rod extending below the discharge openings of the trough and spaced therefrom, supports for the trough and rod, and through which the ends of the latter are journaled, and a flexible fabric applying member through which the rod is removably extended, said member consisting of fabric strips having depending portions provided with selvage edges, and upwardly projecting portions provided with raw edges, the latter of which form a brush and are adapted to contact with the lower portion of the trough, and reinforcing members extended through the depending portions of the fabric strips, all for the purpose described.

CLARENCE O. SHELDON.

Witnesses:
C. H. WATERHOUSE,
SOLON C. KEMON.